United States Patent Office 3,189,662
Patented June 15, 1965

---

3,189,662
ORGANOPOLYSILOXANE-POLYCARBONATE BLOCK COPOLYMERS
Howard A. Vaughn, Jr., Scotia, N.Y., assignor to General Electric Company, a corporation of New York
No Drawing. Filed Jan. 23, 1961, Ser. No. 83,927
6 Claims. (Cl. 260—824)

The present invention relates to novel copolymers and to a method for preparing them. More particularly, the present invention relates to the production of certain hydrolytically stable organopolysiloxane-polycarbonate block copolymers and to the compositions produced thereby.

The novel compositions of the present invention, referred to hereinafter as the "copolymers" have the average formula:

(1)
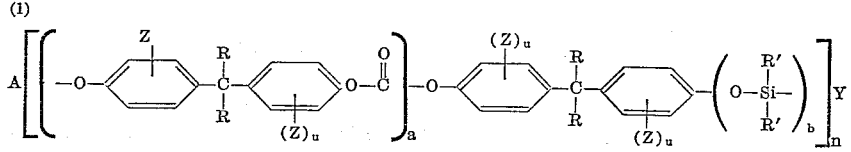

where $n$ is at least 1, and preferably $n$ is an integer equal to from 1 to about 1,000, inclusive, $a$ is equal to from 1 to about 200, inclusive, $b$ is equal to from about 5 to about 200, inclusive, and preferably $b$ has an average value from about 15 to about 90, inclusive, while the ratio of $a$ to $b$ can vary from about .05 to about 3, inclusive, and when $b$ has an average value of from about 15 to about 90, inclusive, the ratio of $a$ to $b$ is preferably from about .067 to about 0.45, inclusive, $u$ is an integer equal to from 1 to 4, inclusive, Y is

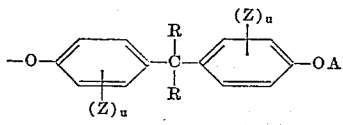

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, and Z is a member selected from the class of hydrogen, lower alkyl radicals and halogen radicals.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl. R' includes all radicals included by R above except hydrogen, where R' also can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc., and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula 1 can be produced by forming at temperatures in the range of 25° C. to 100° C., and in the presence of an acid acceptor, a mixture of a halogenacted chain-stopped polydiorganosiloxane having the formula:

(2)
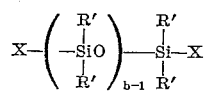

and a dihydric phenol having the formula:

(3)
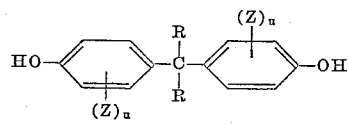

and thereafter phosgenating said mixture until the resulting mass achieves a maximum viscosity, where R, R', Z, u, b are as defined above, and X is a halogen radical preferably chloro.

The halogenated chain-stopped polydiorganosiloxanes of Formula 2 hereinafter referred to as the "halogenated polysiloxane" can be made by conventional procedures such as by the controlled hydrolysis of a diorganodihalosilane, for example, dimethyldichlorosilane as taught in Patnode Patent 2,381,366 and Hyde Patents 2,629,726 and 2,902,507. Another procedure that can be employed involves equilibrating a mixture of a diorganodichlorosilane and a cyclic polydiorganosiloxane in the presence of a metal catalyst such as ferric chloride as shown in Sauer Patent 2,421,653. Although the various procedures utilized in forming the halogenated polysiloxane are not critical, generally it has been found desirable to maintain the halogen content of the resulting halogenated polysiloxane in the range of about 0.4 to about 35 percent, by weight, and preferably from about 1 to about 5 percent by weight of said halogenated polysiloxane. The halogenated polysiloxane is preferably in the form of a chlorinated polydimethylsiloxane.

Dihydric phenols that are included in Formula 3 are for example, 2,2-bis(4-hydroxyphenyl)-propane (Bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc.

One of the principal features of the present invention resides in the production of copolymers having inherent hydrolytic stability. The copolymers of the present invention comprise recurring units consisting of a polydiorganosiloxane interconnected by substituted aryloxy-silicon linkages to a polyester of a carbonic acid precursor and a dihydric phenol. In addition to being hydrolytically stable, the preferred copolymers of the present invention, i.e. those copolymers in Formula 1 where the ratio of *a* to *b* has an average value of from about .067 to about 0.45, are valuable elastomeric materials having high tensile strength, good electrical properties and many other desirable characteristics. Not only do these preferred copolymers possess substantially all of the desirable characteristics of conventionally cured reinforced organopolysiloxanes but the preferred copolymers of the present invention do not have to be reinforced with filler material, such as finely divided silica, which often detracts from the properties of the cured polymer. Certain of the copolymers of the present invention can be fabricated into films and parts by usual molding and extrusion methods.

In the practice of the invention an anhydrous mixture of the halogenated polysiloxane of Formula 2 and the polyhdric phenol of Formula 3 is formed in the presence of a base such as tertiary amine, for example pyridine, and at temperatures sufficient to effect reaction. In the course of the reaction, an intermediate reaction product is produced in the form of a polydiorganosiloxane that is chain-stopped by a substituted aryloxy-silicon linkage with dihydric phenol radicals. This reaction intermediate is then phosgenated, i.e., treated with a precursor of carbonic acid such as carbonyl chloride or carbonyl fluoride until the resulting mixture attains a maximum viscosity.

In the production of the intermediate reaction product, it has been found desirable to employ a suitable inert organic solvent in the reaction mixture to facilitate product formation. Suitable organic solvents include chlorobenzene, methylene chloride, etc., while any organic solvent that is inert to the reactants and sufficiently high in boiling point to achieve satisfactory results can be employed. In addition to serving as an acceptor for by-product acid, a tertiary amine can also be employed as a solvent for the reactants, if desired. Suitable tertiary amines, include for example, pyridine, quinoline, tributylamine, etc.

Although the order of addition of the reactants is not critical it has been found expedient to add the halogenated polysiloxane to an organic solvent solution of the polyhydric phenol and the tertiary amine. Generally, proportions of the halogenated polysiloxane and dihydric phenol that can be employed to form the intermediate reaction product will vary in accordance with the properties desired in the final copolymer. Experience has shown that at least about 0.15 part to about 3 parts of the halogenated polysiloxane, per part of dihydric phenol, can be employed to achieve satisfactory results. The proportions of tertiary amine that are utilized should be at least sufficient to remove all of the by-product acid formed which will vary in accordance with the proportions of the reactants employed.

Temperatures in the range of 25° C. to 100° C. can be employed during the formation of the intermediate reaction product while a preferred range is 25° C. to 75° C.

Phosgenation of the intermediate reaction product, to produce the copolymers of the present invention, can be accomplished by merely passing a carbonic acid precursor such as a halogenated carbonyl, for example, carbonyl chloride or carbonyl fluoride into the resulting intermediate reaction product mixture. During the phosgenation, it has been found expedient to agitate the mixing such as by stirring. As a practical matter, phosgenation can be continued until maximum viscosity of the resulting mixture is achieved, although excess amounts of phosgene can be olerated without adverse effects. The final product can be recovered and purified by conventional procedures such as washing, filtering, precipitation, etc.

In order that those skilled in the art may be better able to practice the invention, the following examples are given by way of illustration and not by way of limitation. All parts are by weight.

A halogenated polysiloxane in the form of a halogenated polydimethylsiloxane was prepared in accordance with the following procedure.

Into a vessel containing 800 parts of dimethyldichlorosilane, there was added over a 2 hour period, a mixture of 100 parts of water and 206 parts of dioxane. The resulting mixture was heated to a gentle reflux with stirring until it had become homogeneous. The mixture was stripped, in vacuo, to a pot temperature of 202° C. at 12 mm. pressure. The stripped hydrolyzate was then filtered to yield 323 parts of a clear oil containing 4.9% hydrolyzable chlorine. The calculated average formula of the halogenated polydimethylsiloxane was as follows based on method of preparation and hydrolyzable chlorine content.

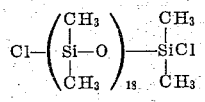

EXAMPLE 1

A mixture of 22.8 parts of 2,2-bis(4-hydroxyphenyl) propane, 275 parts of chlorobenzene and 25 parts of pyridine were placed in a vessel. There was added to the mixture with stirring over a period of one-half hour, 28.8 parts of the above prepared chlorinated dimethylpolysiloxane. The resulting mixture was then heated to a temperature in the range of 55° over a period of one-half hour. Phosgene was then slowly passed into the resulting mixture while it was stirred. A total of 9 parts of phosgene was passed into the mixture before a sharp increase in the viscosity of the mass was observed, while the temperature rose to a maximum of 62° C. The phosgenation of the mixture was continued until the resulting mass achieved a maximum viscosity.

After settling, 110 parts of chlorobenzene was added to the phosgenated reaction mixture and the mass was filtered. The final product was precipitated, by adding methanol to the filtrate. It was then washed with additional methanol and air dried. The yield of dried polymer was 38 parts. A thin film of the pried polymer that was cast from a chloroform solution was found to be strong and elastic. Based on method of preparation and infrared data, the average formula of the copolymer was:

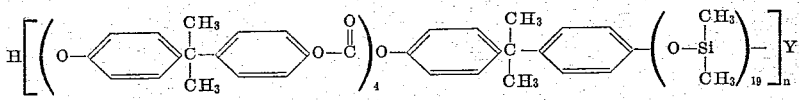

where *n* has an average value of about 250, and Y is

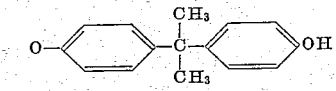

EXAMPLE 2

The procedure of Example 1 was repeated, except that there was utilized 3.6 parts of the halogenated polydimethylsiloxane and 22.8 parts of the 2,2-bis(4-hydroxyphenyl) propane in forming the intermediate reaction product. The final product was found to be a film with an intrinsic viscosity of 1.1 deciliters/gram. The average formula of the final product based on method of preparation and infrared data was:

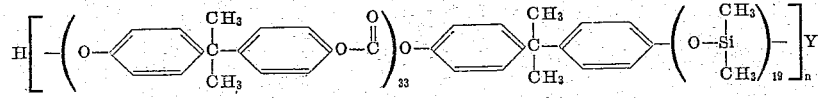

where n has an average value of about 50, and Y is

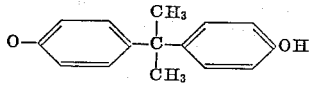

EXAMPLE 3

A procedure similar to Example 1 was employed except that the intermediate reaction product was prepared by utilizing 29 parts of a chlorinated polydimethylsiloxane containing 1.12% hydrolyzable chlorine and 10 parts of 2,2-bis(4-hydroxyphenyl)propane. The intrinsic viscosity of the final product was found to be 0.51 deciliter/gram. The average formula of the final product based on method of preparation and infrared data was:

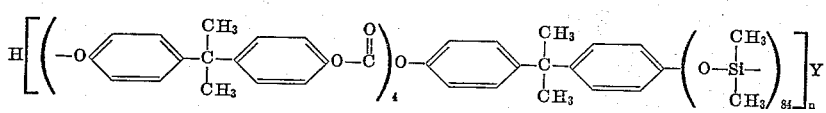

where n has an average value of about 80, and Y is

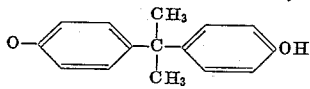

A sample (4" x ¼" x .02") of the copolymer prepared in Example 1, which contained an average of about 53% by weight of polydimethylsiloxane was prepared. This sample was compared to a similar sample of a cured, reinforced polydimethylsiloxane. The conventional cured, reinforced polydimethylsiloxane sample was derived from a polydimethylsiloxane polymer that had a ratio of approximately two methyl radicals per silicon atom attached to silicon through carbon-silicon linkages and a viscosity of about 6 million centistokes. This polydimethylsiloxane polymer had been reinforced with fumed silica, in accordance with procedures known to the art at proportions of about 45 parts of fumed silica per 100 parts of polymer. Table I shows the results obtained when a Tinius-Olsen tester was employed to determine the tensile strength, p.s.i., (T) and elongation percent (E) of the respective samples.

Table I

| Sample | E, percent | T |
|---|---|---|
| Copolymer | 360 | 2,020 |
| Polydimethylsiloxane | 310 | 938 |

In addition to the above samples, samples were also made of the copolymer of Example 2, which had an average of about 12%, by weight, of polydimethylsiloxane, and Example 3 which had an average of about 73% by weight of polydimethylsiloxane. A comparison of the ultimate tensile strength of these samples was made with a Tinius-Olsen tester. It was found that the copolymer of Example 2 that contained an average weight of only about ⅙ of the polydimethylsiloxane of that contained in Example 3 had an ultimate tensile strength of about 30 times that of the latter, or 11,991 p.s.i.

The copolymers of the present invention can be employed as surface coverings for appliances, as insulation, as coatings for rods and wires, as binding material for parts and laminates, and in adhesive formulations, etc.

While the forgoing examples have of necessity been limited to only a few of the very many variables within the scope of the present invention, it should be understood that the present invention covers a broad class of organopolysiloxane-polycarbonate blocked copolymers of Formula 1 which are produced as the result of phosgenating the intermediate produced by forming a reaction mixture of the compositions of Formula 2 and Formula 3.

The examples have of necessity been directed to only a few of the many process variables which are practicable in the practice of the process of the present invention. It should be understood, however, that the process of the present invention is illustrated by both the specific examples given as well as by the detailed description of the present invention which preceded these examples.

What I claim as new and desire to secure by Letters Patent of the United States is:

1. Block copolymers of (A) from 10 to 75 percent by weight of a polydiorganosiloxane composed of from about 5 to about 200 chemically combined diorganosiloxy units consisting essentially of dialkylsiloxy units which are connected to each other by silicon-oxygen-silicon linkages wherein each of the silicon atoms has two organo radicals attached through a carbon-silicon bond and (B) from 90 to 25 percent by weight of an intercondensation product of a dihydric phenol and a carbonyl halide, where said polydiorganosiloxane and said intercondensation product are joined by aryloxy-silicon linkages.

2. A block copolymer in accordance with claim 1, where said polydiorganosiloxane is a polydimethylsiloxane.

3. A block copolymer of (A) from 10 to 75 percent by weight of a polydiorganosiloxane composed of from about 5 to about 200 chemically combined dimethylsiloxy units which are connected to each other by silicon-oxygen-silicon linkages wherein each of the silicon atoms has two methyl radicals attached through a carbon-silicon bond and (B) from 90 to 25 percent by weight of an intercondensation product of 2,2-bis(4-hydroxyphenyl)propane and phosgene, where said polydimethylsiloxane and said intercondensation product are joined by phenoxy-silicon linkages.

4. A block copolymer in accordance with claim 1 in which the dihydric phenol is a bis-phenol.

5. A block copolymer in accordance with claim 4, in which the bis-phenol is 2,2-bis(4-hydroxyphenyl)propane.

6. A process for making block copolymers which comprises (1) reacting at temperatures in the range of 25° C. to 100° C., (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula:

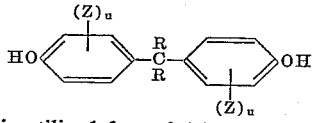

where there is utilized from 0.15 part to 3 parts of (A) per part of (B), and (2) phosgenating the reaction product of (1) until the resulting mass achieves a maximum viscosity, where u is an integer equal to from 1 to 4, inclusive, Z is a member selected from the class consisting of hydrogen, lower alkyl radicals and halogen radicals, and R is a member selected from the class consisting of hydrogen and lower alkyl radicals.

References Cited by the Examiner
UNITED STATES PATENTS
2,999,845  9/61  Goldberg _____ 260—47
FOREIGN PATENTS
1,198,715  12/59  France.

LEON J. BERCOVITZ, Primary Examiner.

D. ARNOLD, Examiner.